United States Patent [19]

Hildebrand et al.

[11] Patent Number: 4,656,877
[45] Date of Patent: Apr. 14, 1987

[54] ASSEMBLY FOR TRANSMITTING ROTARY MOTION IN AUTOMOTIVE AIR CONTROL SYSTEM

[75] Inventors: Reinhard Hildebrand; Friedrich Riedel, both of Redwitz, Fed. Rep. of Germany

[73] Assignee: Siemens Aktiengesellschaft, Berlin and Munich, Fed. Rep. of Germany

[21] Appl. No.: 777,603

[22] Filed: Sep. 19, 1985

[30] Foreign Application Priority Data

Sep. 26, 1984 [DE] Fed. Rep. of Germany ....... 3435359

[51] Int. Cl.4 ............................................. F16H 21/14
[52] U.S. Cl. ............................................ 74/68; 74/63; 74/89.12; 74/89.17; 237/12.3 R
[58] Field of Search ...................... 74/22 A, 23, 29, 63, 74/65, 66, 68, 24, 89.11, 89.12, 89.17; 237/12.3 R, 12.3 A, 12.3 B

[56] References Cited

U.S. PATENT DOCUMENTS 2,342,901 2/1944 Schutt et al. ................ 237/12.3 B X
4,326,667 4/1982 Murata et al. .

FOREIGN PATENT DOCUMENTS 2510944 5/1976 Fed. Rep. of Germany .
2523331 12/1976 Fed. Rep. of Germany .
3206288 9/1983 Fed. Rep. of Germany .

Primary Examiner—Henry A. Bennet
Attorney, Agent, or Firm—Kenyon & Kenyon

[57] ABSTRACT

An assembly for transmitting rotary motion from an actuator knob to an operating mechanism in the heating, air conditioning and ventilating system of an automotive vehicle comprises a rack and pinion rotatably connected to the actuator knob. The rack is linked to the operating mechanism via a positioning lever and an intermediate lever.

5 Claims, 1 Drawing Figure

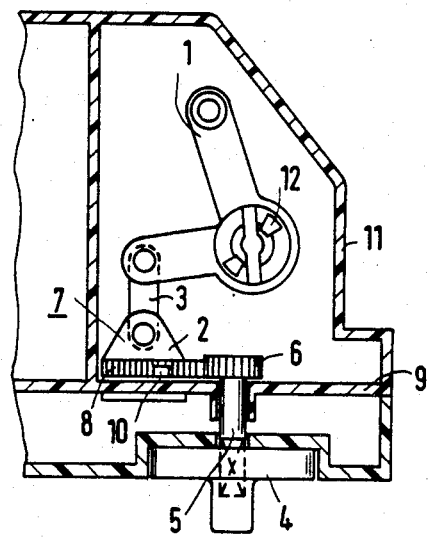

ASSEMBLY FOR TRANSMITTING ROTARY MOTION IN AUTOMOTIVE AIR CONTROL SYSTEM

BACKGROUND OF THE INVENTION

This invention relates to an assembly for transmitting rotary motion from a manually rotatable actuator knob to an operating mechanism in the air control system of an automotive vehicle.

Such assemblies are predominantly found at the instrument panels of automotive vehicles and frequently comprise a sliding element operatively connected to the actuator knob and disposed in a housing. An intermediate lever is attached at one end to the sliding element and is linked at an opposite end to a positioning lever coupled to the operating mechanism of the heating, air conditioning and ventilating system.

Some of the known transmission assemblies of the above-described type include a Bowden cable, a rack being provided for the automatic transmission of the positioning motion from the rotary actuator knob to the fastening point of the Bowden cable. See, for example, U.S. Pat. No. 4,326,667. In such a transmission assembly, the rotary actuator knob is fastened to a gear shaft.

Conventional designs do not enable the conversion of a rotary motion of the operating lever into a rotary motion of the positioning lever with a self-latching function.

An object of the present invention is to provide an improved and simplified rotary motion transmission assembly of the above-described type.

Another object of the present invention is to provide such a transmission assembly which enables the use of a self-latching function.

Another object of the present invention is to provide such a transmission assembly which converts a rotary motion of an actuator knob into circular motion of a positioning lever.

SUMMARY OF THE INVENTION

The present invention is directed to an assembly for transmitting rotary motion from a manually rotatable actuator knob to an operating mechanism in an air control system of an automotive vehicle. In accordance with the invention, the assembly comprises a sliding element formed with a rack which meshes with a pinion provided on a shaft. The shaft is rotatably mounted to a housing, while the sliding element is shiftably mounted to a guide track provided in the housing. An intermediate lever is pivotably connected at a first end to the sliding element and at a second end to a positioning lever rotatably mounted to the housing. The manually rotatable actuator knob is attached to the shaft at an end thereof spaced from the pinion.

In accordance with another feature of the present invention, an elastomeric plastic element is incorporated into the sliding element for engaging under pretension a rigid structural component of the housing to ensure that required operating forces can arise. In this manner, the operating forces can be set by the magnitude of a pretension applied to the elastomeric plastic element. Elastomeric plastics with a Shore hardness of 50° to 70° have been found to be particularly advantageous in this regard.

Pursuant to further features of the present invention, the intermediate lever has a longitudinal axis extending at an angle of 80° to 100° with respect to the guide track, while the positioning lever is fastened to the housing by a rotatably supported bayonet lock.

The combination of rack and pinion and intermediate lever in accordance with the present invention enables the conversion of rotary motion of the actuator knob into a circular motion of the positioning lever. The sliding element formed with the rack acts as a transmission lever, this lever being shifted parallel to the guide track in the housing.

The limitation of the angle between the intermediate lever and the guide track to 90°±10° enables a self-locking of the positioning lever in at least one end position.

BRIEF DESCRIPTION OF THE DRAWING

The sole Figure of the drawing is a partially elevational and partially cross-sectional view of a rotation transmission assembly in accordance with the invention.

DETAILED DESCRIPTION

A V-shaped positioning lever 1 is rotatably mounted to a plastic housing 11 by means of a rotatable bayonet lock 12. One arm of the positioning lever is pivotably connected to one end of an intermediate or linking lever 3. An opposite end of the intermediate lever 3 is pivotably connected to a flange or bracket 2 of a sliding transmission member or lever 7. Sliding member 7 includes a rack 8 rigid at one end with flange or bracket 2. Sliding member 7 is shiftably or slidably mounted to a guide track 9 in housing 11.

Rack 8 of sliding member 7 meshingly engages a pinion 6 formed at an inner end of a shaft 5 rotatably mounted to housing 11. An outer end of shaft 5 is provided with a manually grippable actuator knob 4.

Sliding member 7 is also provided with a resilient elastomeric element 10 engageable under pretension with a rigid structural component (not illustrated) of housing 11 to ensure that required operating forces can be exerted. In this manner, the operating forces can be set by the magnitude of a pretension applied to the elastomeric plastic element.

Although the invention has been described in terms of a specific embodiment and application, one of ordinary skill in the art, in light of this teaching, can generate additional embodiments and modifications without departing from the spirit of or exceeding the scope of the claimed invention. Accordingly, it is to be understood that the descriptions and illustration herein are proferred to facilitate comprehension of the invention and should not be construed to limit the scope thereof.

What is claimed is:

1. An assembly for transmitting rotary motion from a manually rotatable actuator knob to an operating mechanism in an air control system of an automotive vehicle, said assembly comprising:
 a housing including a guide track;
 a sliding element formed with a rack, said sliding element being shiftably mounted to said guide track in said housing;
 an intermediate lever pivotably connected at a first end to said sliding element;
 a positioning lever rotatably mounted to said housing and pivotably linked to said intermediate lever at a second end thereof opposite said first end; and
 a shaft rotatably mounted to said housing, said shaft being provided with a pinion meshing with said rack, the manually rotatable actuator knob being attached to said shaft at an end thereof spaced from said pinion.

2. The assembly recited in claim 1, further comprising an elastomeric plastic element incorporated into said sliding element for engaging under pretension a rigid structural component of said housing to ensure that required operating forces can be achieved.

3. The assembly recited in claim 2, wherein said intermediate lever has a longitudinal axis extending at an angle of 80° to 100° with respect to said guide track.

4. The assembly recited in claim 1, 2 or 3, further comprising a rotatably supported bayonet lock, said positioning lever being fastened to said housing by said bayonet lock.

5. The assembly recited in claim 1, wherein said intermediate lever has a longitudinal axis extending at an angle of 80° to 100° with respect to said guide track.

* * * * *